United States Patent [19]

Galantay

[11] 3,764,596

[45] Oct. 9, 1973

[54] 17-DIHYDROFURANYL-SUBSTITUTED STEROIDS

[75] Inventor: Eugene E. Galantay, Morristown, N.J.

[73] Assignee: Sandoz-Wander, Inc., Hanover, N.J.

[22] Filed: June 22, 1971

[21] Appl. No.: 155,642

[52] U.S. Cl. .......... 260/239.55, 260/397.5, 424/241

[51] Int. Cl. .......... C07c 173/00

[58] Field of Search .......... 260/239.55; /Machined Searched Steroids

[56] References Cited

UNITED STATES PATENTS 3,586,669 6/1971 Rasmusson et al. .......... 260/239.55

*Primary Examiner*—Elbert L. Roberts

*Attorney*—Gerald D. Sharkin et al.

[57] ABSTRACT

Steroids of the gonane skeleton bearing a 17-dihydrofuranyl are prepared by treating a 17$\alpha$-propadienyl-substituted steroid with silver (I) cation, and are useful as pharmaceuticals.

16 Claims, No Drawings

17-DIHYDROFURANYL-SUBSTITUTED STEROIDS

This invention relates to steroidal compounds, and more particularly to steroidal 17-dihydrofurans, and to the preparation thereof, as well as to pharmaceutical compositions containing said compounds and to the use of said compositions.

The compounds of this invention are gonane derivatives and are conveniently represented by the formula

I.

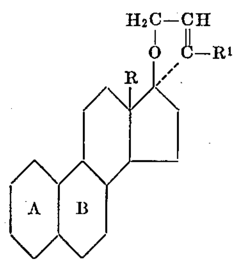

wherein

R is unbranched alkyl having from one to three carbon atoms, i.e., methyl, ethyl and n-propyl;

$R^1$ is a hydrogen atom or alkyl having from one to three carbon atoms, e.g., methyl, ethyl or propyl (including isomeric forms where they exist, but are preferably unbranched); and rings A and B represents the steroidal residue:

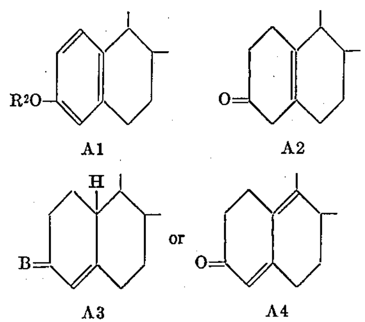

wherein $R^2$ is a hydrogen atom, alkyl having from one to three carbon atoms, e.g., methyl, ethyl or propyl (including isomeric forms where they exist, but are preferably unbranched), cycloalkyl containing five to seven carbon atoms, e.g., cyclopentyl, cyclohexyl or cycloheptyl, and alkanoyl having from two to four carbon atoms, e.g., acetyl, propionyl and butyryl, ( including isomeric forms where they exist, but are preferably unbranched); and B is oxo or

H
≡—OR₂ wherein $R^2$ is as defined above.

Compounds I may be prepared by treating a Compound II

II.

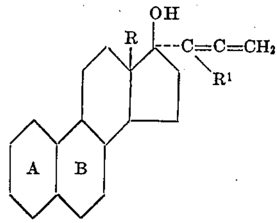

wherein R, $R^1$ and rings A and B are as defined above with silver (I) cation in a suitable medium, preferably essentially in the absence of light.

The silver cation can be provided, and the process can be carried out in various ways. For example, a water-soluble silver salt may be dissolved in a mixture of water and an organic water-miscible cosolvent, a Compound II then dissolved in the silver solution and the mixture held at a temperature of, e.g., from about 0° to 50° C., preferably at from about 18° to 25° C., until a substantial portion of the Compound II is converted to Compound I, e.g., a period of from about 2 to 24 hours. Suitable cosolvents include ethanol, methanol, acetone, dioxane or acetonitrile. Suitable silver salts include silver nitrate (which is preferred), silver acetate, and silver perchlorate (Process a). Alternatively, a Compound II may be dissolved in an aprotic solution of $AgBF_4$ under the conditions described above; the aprotic solvent being preferably an ether such as dimethoxyethane (Process b).

Silica gel may be impregnated with a solution of $AgNO_3$ in acetonitrile-water (e.g., 1 to 10:1) dried at room temperature, and the impregnated silica gel mixed with a solution of a Compound II in chloroform under the conditions described above. Alternatively, the impregnated silica gel may be formed into a column or plate and the chloroform solution passed through or over the impregnated silica gel body (Process c). Process c), should not be utilized however, with a Compound II having the structure A2.

Compounds II are known and are obtainable, e.g., aS described in Belgian Pat. Nos. 731,207 and 742,137.

The process of this invention is novel and is particularly surprising in that it not only gives high yields, but that the protection of starting materials, with the inconvenience and inefficiency of subsequent deprotecting and/or rearrangement of double bonds commonly encountered in reactions in the steroid art, is not required.

Compounds I are useful because they possess pharmacological properties in animals. In particular, such compounds are useful as fertility control agents in female animals. Compounds I having the Al structure, possess estrogenic activity as demonstrated by standard tests for estrogenic activity, e.g., in the mouse and rat as determined by the method basically described in Endocrinology 65 (1959) and Am. J. Physiol. 189 (1957) 355, respectively, and are useful as estrogenic agents, e.g., in control of fertility and in treating estrogen deficiencies, in warm-blooded animals, e.g. mammals.

The Compounds I having structures A2, A3 or A4 possess progestational activity as indicated, e.g., by the well known Clauberg test; the method basically described in Endocrinology 63 (1958) 464 wherein the rabbit is given 0.01 to 1.0 milligrams of active agent, and are useful in controlling fertility and in regulating estrus or the menstrual cycle, in female warm-blooded animals, e.g., mammals.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.05 milligrams to 30 milligrams. This daily dosage may be given in a single dose or in equally divided doses, e.g., one to two times a day, or in sustained release form. It will be appreciated by those skilled in the art, that the daily dosage level is independent of body weight. Dosage forms suitable for internal administration comprise from about 0.025 milligrams to about 30 milligrams of the compound in admixture with a solid or liquid pharmaceutical carrier or diluent.

A representative formulation suitable for oral administration is a tablet prepared by standard tabletting techniques which contains the following:

| Ingredients | Parts by weight |
|---|---|
| 3-Methoxy-17α-(1'-Propenyl)-17β, 3'-oxidoestra-1,3,5(10)-triene | 0.5 |
| Tragacanth | 2 |
| Lactose | 89 |
| Corn starch | 5 |
| Talcum | 3 |
| Magnesium stearate | 0.5 |

The compound I having the structure A2, $R^1$ is H and R is methyl is additionally useful as an intermediate in the preparation of estr-4-ene-3-one-spiro-17α-2'- (tetrahydrofuran) an anti-estrogenic steroid (Endocrinology 79, 125 [1966]).

This invention is illustrated but not limited by the following examples, wherein temperatures are in Centigrade and room temperature is 20° to 30° C., unless indicated otherwise.

EXAMPLE 1

3-Methoxy-17α-(1'-propenyl)-17β,3'-oxidoestra-1,3,5(10)-triene

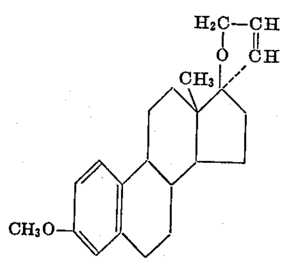

To a solution of 400 mg of 3-methoxy-17α-propadienylestra-1,3,5(10)-trien-17β-ol in 10 ml of chloroform there is added 1.0 g of silica-gel $AgNO_3$ and the mixture stirred in the dark, at 25°, for 24 hours. The silica gel is filtered off, and the chloroform filtrate and washings are evaporated to dryness to yield the title product which is then recrystallized from ether.

By repeating the procedure of this example, but replacing the 3-methoxy-17α-propadienylestra-1,3,5(10)-trien17β-ol used therein with an equivalent amount of 3 methoxy-17α(2',3'-butadien-2'yl)estra-1,3,5(10)-trien-17β-ol or 17α-propadienylestra-4-en-17β-ol-3-one there is similarly obtained 17α-(2'-buten-2'-yl)-3-methoxy-17β, 4'-oxidoestra-1,3,5(10)-triene (m.p. 135°–9° C.) or 17α-(1'-propenyl)-17β, 3'-oxidoestra-4-en-3-one.

EXAMPLE 2

13-Ethyl-17α-(1'-propenyl)-17β,3'-oxidogona-5(10)-en-3-one

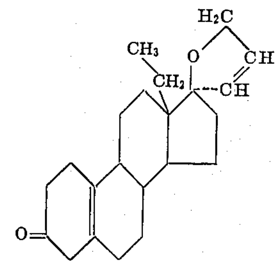

200 mg of 13-ethyl-17α-propadienyl-goneh-5(10)-17β-ol-3-one, dissolved in 5 ml of ethanol, is added to a solution of 200 mg of silver nitrate in 10 ml of 70% aqueous ethanol. After 24 hours in the dark at room temperature, 15 ml of water is added and the product extracted with methylene chloride (3×3 ml); and crystallized from acetone-hexane (3:1).

EXAMPLE 3

17α-(1'-Propenyl)-17β,3'-oxidoestra-4,9-dien-3-one

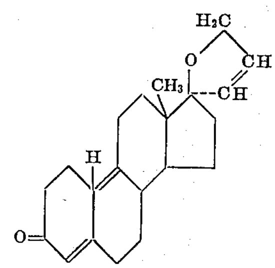

200 mg of 17α-propadienyl-4,9-estradien-17β-ol-3-one is added to a solution of 150 mg of silver fluoroborate ($AgBF_4$) in 6 ml of 1,2-dimethoxyethane. After 24 hours at 25° and in the dark, 12 ml of water is added and the product extraced and isolated as described in Example 2.

What is claimed is:

1. A compound of the formula

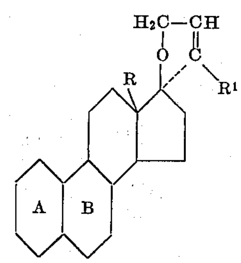

wherein

R is unbranched alkyl having from one to three carbon atoms, $R_1$ is a hydrogen atom or alkyl having from one to three carbon atoms, and rings A and B represents the steroidal residue:

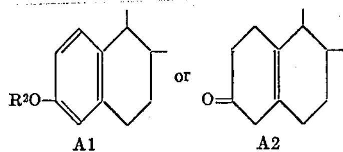

wherein $R^2$ is a hydrogen atom, alkyl having from one to three carbon atoms, cycloalkyl containing five to seven carbon atoms, or alkanoyl having from two to four carbon atoms.

2. A compound of claim 1 wherein rings A and B are of type A1.

3. The compound of claim 2 which is 3-methoxy-17α-(1'-propenyl)-17β,3'-oxidoestra-1,3,5(10)-triene, 4. The compound of claim 2 which is 17α-(2'-buten-2'-yl)-3-methoxy-17β-4'-oxidoestra-1,3,5(10)-triene.

5. A compound of claim 1 wherein rings A and B are of type A2.

6. The compound of claim 5 which is 13-ethyl-17α-(1'-propenyl)-17β,3'-oxidogona-5(10)-en-3-one.

7. A compound of the formula

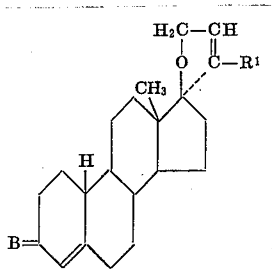

wherein $R^1$ is as defined in claim 1; and

B is oxo or $\overset{H}{\equiv}OR^2$ wherein $R^2$ are as defined in claim 1.

8. The compound of claim 7 which is 17α-(1'-propenyl)-17β-3'-oxidoestra-4-en-3one.

9. A compound of the formula

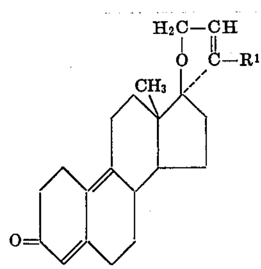

wherein $R^1$ is as defined in claim 1.

10. The compound of claim 20 which is 17α-(1'-propenyl)-17β,3'-oxidoestra-4,9-dien-3-one.

11. A process for process for preparing a compound of the formula

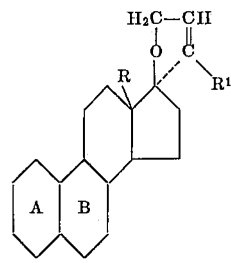

wherein $R^1$ is a hydrogen atom or alkyl having from one to three carbon atoms, rings A and B represents the steroidal residue:

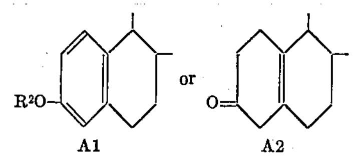

wherein $R^2$ is a hydrogen atom, alkyl having from one to three carbon atoms, cycloalkyl containing five to seven carbon atoms, or alkanoyl having from two to four carbon atoms; and R is unbranched alkyl having from one to three carbon atoms; or rings A and B represents the steroidal residue:

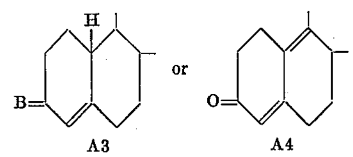

wherein

B is oxo or $\overset{H}{\equiv}OR_2$ $R^2$ is as defined above; and

R is methyl, which comprises contacting a compound of the formula

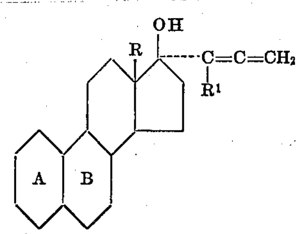

wherein R, $R^1$ and rings A and B are as defined above, with silver (I) ion.

12. A process of claim 11 wherein the source of the silver (I) ion is silver nitrate.

13. A process of claim 11 wherein the source of the silver (I) ion is $AgBF_4$.

14. A process of claim 11 which is carried out essentially in the absence of light.

15. A process of claim 11 which is carried out at a temperature of from about 18° to 25° C.

16. A process of claim 11 in which the source of the silver (I) ion is silver nitrate-impregnated silica gel, provided that rings A and B are other than type A2.

* * * * *